United States Patent [19]
Doherty

[11] 3,897,226
[45] July 29, 1975

[54] CONTROLLING THE CONCENTRATION OF IMPURITIES IN A GAS STREAM

[75] Inventor: Keith Stanley Doherty, Cheadle, England

[73] Assignee: Petrocarbon Developments Limited, Manchester, England

[22] Filed: Apr. 19, 1973

[21] Appl. No.: 352,748

[30] Foreign Application Priority Data
Apr. 19, 1972 United Kingdom............... 18166/72

[52] U.S. Cl. ............................ 55/33; 55/62; 55/179
[51] Int. Cl.² .......................................... B01D 53/04
[58] Field of Search ............... 55/33, 62, 68, 74, 75, 55/179; 73/23

[56] References Cited
UNITED STATES PATENTS

| | | | |
|---|---|---|---|
| 3,002,583 | 10/1961 | Findlay | 55/197 |
| 3,140,931 | 7/1964 | McRobbie | 55/179 |
| 3,176,445 | 4/1965 | Collins et al. | 55/179 |
| 3,243,938 | 4/1966 | Lavery et al. | 55/62 |
| 3,540,188 | 10/1971 | Barrere et al. | 55/62 |
| 3,738,084 | 6/1973 | Simonet et al. | 55/62 |

Primary Examiner—Charles N. Hart
Attorney, Agent, or Firm—Browdy and Neimark

[57] ABSTRACT

FLUCTUATING CONCENTRATIONS OF IMPURITY in a gas stream such as a regenerating stream recovered from an adsorber unit, are smoothed by diverting at least a portion of the gas stream through a bed of adsorbent for the impurity while the concentration of the impurity exceeds a predetermined value, and continuing the diversion of the stream for a period after the impurity concentration has dropped back below that level so as to strip the adsorbed impurity from the bed to regenerate it for the next adsorption cycle. The invention is particularly applicable to the treatment of natural gas regenerating streams containing fluctuating amounts of an impurity such as carbon dioxide, and also water vapor as a second impurity, and further includes a method of reducing the water dew point of such streams.

19 Claims, 6 Drawing Figures

CONTROLLING THE CONCENTRATION OF IMPURITIES IN A GAS STREAM

This invention relates to a method and apparatus for controlling the concentration of impurities in a gas stream and is especially applicable to upgrading the quality of regenerating streams used in the regeneration of adsorbers used in the purification of gaseous process streams.

Where a gaseous process stream, e.g. natural gas, is to be liquefied, or otherwise subjected to cryogenic processing, it is generally necessary first to remove any constituents that would freeze at the low temperatures involved. Examples of such constituents are water vapor and carbon dioxide but frequently the gas may contain other impurities which freeze at the cryogenic temperatures to be employed.

It is generally advantageous to remove some or all of these impurities by adsorption on beds of adsorbents, e.g. silica gel, activated alumina or synthetic zeolites, generally known as molecular sieves. It is common practice to install two such beds in parallel in an adsorption unit so that while one bed is being used to adsorb the impurities from a gaseous process stream the other may be regenerated by passing through it a relatively small stream of gas which desorbs the adsorbed impurity from the bed of adsorbent.

This regenerating gas is utilized at a higher temperature and/or a lower pressure than the gaseous process stream. Raising the temperature and/or lowering the pressure enables the regenerating stream to be substantially smaller than the process stream, a condition obviously necessary to make the process viable in the case where the regenerating stream is derived from the purified process stream. In some cases, more than two parallel beds may be installed, operated in a suitable cycle.

As long as the regenerating stream, after passing through the beds of the adsorption unit to perform its regeneration duty, can be discarded or flared, no special problems arise in carrying out this process. However, in many cases, it is desirable to put this regenerating stream to some further use. In this case the composition of the regenerating stream after performing its duty may be important.

Since the regenerating stream is generally substantially smaller than the process stream undergoing purification and since it has to remove from the adsorber bed substantially all the impurities previously removed from the process stream by that bed, the average concentration of the impurities in the regenerating stream leaving the regenerated bed must evidently be higher than the concentration of these impurities in the feed gas.

Moreover, desorption does not proceed at the same rate throughout the regeneration period and therefore the concentration of the desorbed impurity in the regenerating stream tends to fluctuate.

This can be illustrated with reference to FIG. 1 of the accompanying drawings which illustrates the case where a gas stream which is hotter than the process stream undergoing purification is used for regeneration. At the commencement of the regeneration, the bed of adsorbent will be cooler than the regenerating stream and therefore its temperature will be raised during the regeneration process. Consequently, the temperature of the regenerating stream leaving the adsorbent will also rise during the regeneration process as illustrated by the broken curve in FIG. 1. The rate of desorption of the impurity from the adsorbent is temperature dependent so that as the temperature of the adsorbent bed rises, the rate of desorption rises. Thus, the concentration of impurity picked up by the regenerating stream will initially increase until it reaches a peak and will thereafter decrease as the concentration of impurity in the adsorbent falls away. This is illustrated by means of the continuous curve in FIG. 1.

The high local concentrations of impurity that result from this may be unacceptable for certain subsequent applications of the regenerating stream.

We have now found a method of reducing or obviating this disadvantage.

In accordance with the present invention, there is provided a method of upgrading a gas stream containing fluctuating amounts of impurity which comprises:

i. diverting at least a proportion of said gas stream through an adsorption zone containing an adsorbent for said impurity while the concentration of the impurity in said gas stream exceeds a predetermined level and after passage through said zone recombining the diverted portion with the remainder, if any, of the gas stream, ii. continuing the diversion of at least a proportion of the gas stream through said adsorption zone after the concentration of the impurity in the gas stream has dropped below said level whereby to desorb the impurity adsorbed by the adsorbent, and controlling the proportion of the gas stream that is diverted so as to maintain the overall concentration of the impurity in the recombined stream at or below a given level.

Desorption will generally be regarded as complete when the concentration of the impurity in the diverted stream leaving the adsorber is substantially the same as that being fed to the adsorber.

The invention also provides apparatus for upgrading a gas stream containing fluctuating amounts of impurity and comprising a pipeline for carrying said stream, a vessel for containing a bed of adsorber for the impurity and having a gas inlet and gas outlet for the gas stream passing through said bed the inlet and outlet each being connected to said pipeline, valve means for controlling the amount of the gas stream in the pipeline which is passed into said vessel, means for ascertaining the level of the concentration of the impurity in the pipeline downstream of the connection with the outlet from the vessel, and means responsive to said ascertaining means for controlling the valve means to maintain the level of the concentration of the impurity in the pipeline downstream of the outlet from the vessel below a predetermined level.

Where the gas stream contains two or more impurities in fluctuating amounts, several such apparatus may be used in series, the adsorber in the vessel of each apparatus being selected to be capable of selectively adsorbing one or more of the impurities in the gas stream.

The adsorption zone, hereinafter referred to as the guard adsorber, may comprise a single bed of adsorbent or a plurality of adsorbent beds in series and/or in parallel. For example, where the gas stream contains more than one impurity and each is present in fluctuating amounts, it may be found desirable to use a plurality of beds of adsorbent in series, one or more of the impurities being preferentially adsorbed by each bed. The use of parallel beds of adsorbent may be desirable where abnormally large fluctuations of impurity are found in the gas, the zones being used sequentially or simultaneously.

Where the gas stream is a regenerating stream which has been used for regenerating adsorbent beds in an adsorption unit used in the purification of a process stream, e.g. natural gas, and where the regenerating stream is heated for the purposes of regeneration to a temperature above that of the process stream being purified, it will be necessary or at least desirable to cool the regenerating stream before passing it through the guard adsorber in accordance with the method.

Many process streams may contain a second impurity that requires removal before the stream can be safely subjected to cryogenic conditions. In such cases, the stream may be passed through a second adsorber unit in series with the first whereby each adsorber unit selectively adsorbs one of the impurities to the exclusion or substantial exclusion of the other.

The method of the invention can suitably be applied to such a system to provide an upgraded stream from the regeneration gases from the adsorber units. In accordance with this embodiment each adsorber unit is supplied with a separate regenerating stream, and the upgraded regenerating stream is combined with the regenerating stream from the second adsorber unit to provide the upgraded gas stream for further processing. In practice, the regenerating streams that are to be combined for subsequent processing will almost always be obtained from the same source but this is not essential provided that they are sufficiently compatible in composition to be combined to form a useful stream for further processing.

If desired, the regenerating stream from the second adsorber may also be upgraded by the method of the invention.

This embodiment of the invention is equally applicable to the production of upgraded gas streams from the regenerating gases obtained from more than two adsorber units traversed in series by a process gas containing two or more impurities. In such cases, each adsorber unit may selectively adsorb one or more (but preferably only one) of the impurities to the exclusion or substantial exclusion of the other impurity or impurities being removed from the process stream, the arrangement being such that combination of the adsorber units has the capacity to adsorb all the impurities to be removed from the process gas. One or more than one of the regenerating streams from the adsorber units may be upgraded by the method of the invention and each upgraded stream may be combined with one or more than one other regenerating stream preferably originating from the same source. Moreover one or more of the regenerating streams with which it is combined may also be upgraded by the method of the invention.

Where a plurality of adsorber units are used as described above to purify a process stream which passes through them in series, and at least two of the adsorber units are provided with separate regenerating streams which are supplied from the same source, the location along the series of adsorber units of the adsorber unit or each adsorber unit whose regenerating stream is upgraded by the method of the invention is not critical. Thus, in the simplest case of two adsorber units, the adsorber units, the adsorber unit whose regenerating gas is upgraded in accordance with the method of the invention may be the first or the second unit through which the process stream passes.

Thus, for example, where the process stream comprises a gaseous hydrocarbon feedstock such as natural gas, which may contain water vapor and another impurity, e.g. carbon dioxide, as two impurities requiring removal prior to any cryogenic processing such as liquefaction, it is usual for the water vapor adsorber unit to precede the carbon dioxide adsorber unit, because whereas the generally preferred materials used for adsorbing the carbon dioxide may also have the ability to adsorb water vapour, the materials generally preferred for absorbing water vapor usually have little or no tendency to adsorb carbon dioxide. The regenerating stream from the carbon dioxide adsorber unit will contain fluctuating amounts of carbon dioxide and is therefore suitable for upgrading by the method of the invention prior to recombination with the regenerating stream from the water vapor adsorber unit to provide a stream suitable for use as a process stream.

For some applications, the water dew point of this combination process stream may be too high because of the concentration of water vapor in the regenerating stream from the water vapor adsorber unit. This disadvantage can be reduced or eliminated by passing the regenerating stream at elevated temperature through the water vapor adsorber to regenerate it and thereafter cooling the regenerating stream, e.g. by heat exchange with cold water, to condense out water. The combination stream obtained by combining this regenerating stream with that from the other adsorber unit, e.g. the carbon dioxide adsorber unit, will have a reduced water dew point and a smoothed second impurity, e.g. carbon dioxide, concentration and is therefore of much improved suitability as a process stream in its own right.

For example, in the purification of natural gas by the removal of water vapor and carbon dioxide, e.g. prior to liquefaction for storage, where the regenerating streams for the two adsorber units are provided from the purified natural gas stream, the stream obtained by combining the regenerating streams from the two adsorbers after treatment in this manner is suitable for return to the main stream from which the natural gas has been withdrawn for purification and liquefaction. For example, where the natural gas has been withdrawn from a gas main for purification and liquefaction, the stream obtained by combining the regenerating streams may be returned to the gas main or injected into, for example, a domestic gas supply distribution network supplied by that main.

Hitherto, obtaining such a stream from adsorber unit regenerating streams has required the utilization of expensive chemical methods requiring complicated capital equipment. The present method avoids the use of chemicals and provides a simple, economical and reliable means of achieving this.

Where the product of combining the regenerating streams is to be returned to the main, it will generally be necessary to re-pressurize it to make up for the pressure drop occurring through the purification and regeneration system. However, where it is to be injected into a domestic gas supply distribution system, repressurization may not be necessary because the distribution system will generally be at a lower pressure than the main.

Where reduction of the water dew point is of itself sufficient to upgrade the combined regenerating stream to the desired extent for subsequent use and the nature of the impurity adsorbed by the second adsorber unit or the peak concentration of that impurity in the regenerating stream from that second adsorber unit is such that the presence of fluctuating concentrations of that impurity is tolerable in the stream resulting from combining this regenerating stream with that from the water vapor adsorber unit, then the guard adsorber for the regenerating stream from that second adsorber unit may be omitted.

Thus, in accordance with a further aspect of the invention, there is provided a method of obtaining a regenerating stream having a low water dew point from adsorber units used in the purification of a gas streams containing water vapor and at least one other impurity which method comprises passing said gas stream in series through at least two adsorber units one of which adsorbs the water vapor and the other which adsorbs said other impurity, passing a first regenerating stream at elevated temperature through the water vapor adsorber unit to desorb the water vapor therefrom, passing another regenerating stream through said other adsorber unit to desorb said other impurity therefrom, cooling the regenerating stream leaving the water vapor adsorber unit to condense water therefrom, separating out the condensed water and combining the residual gas stream with the regenerating stream from said other adsorber unit.

An alternative method in accordance with the invention for obtaining a subsequently utilization stream from the regeneration streams recovered from the adsorber units arranged in series to remove respectively water vapor and another impurity such as carbon dioxide from a gaseous hydrocarbon feedstock comprises utilising at least a portion of the regenerating stream from the carbon dioxide adsorber unit subsequent to upgrading it by the method of the invention as the regenerating stream for feeding to the water vapor adsorber unit at elevated temperature, subsequently cooling it to condense out water and recombining it with the remainder, if any, of the upgraded regenerating stream. In general, the stream required for regenerating the water vapor adsorber unit will be smaller than that required for regenerating the other adsorber unit, e.g. the carbon dioxide adsorber unit, so that only a portion of the latter is required for the former. It will be seen that this method is more economic in its requirements of the purified hydrocarbon feedstock for regeneration purposes but the reduction in water dew point is not as great.

The invention is of particular application to the upgrading of the regenerating gas from the purification section of gas peak shaving plants. Gas peak shaving plants are plants for the purification and liquefaction of gas obtained from a gas main for subsequent storage to provide emergency supplies of gas during periods of high consumption. In a peak shaving plant, for example, gas, e.g. natural gas, is removed from a gas main, purified, liquefied and stored in liquid form. The liquid gas is then revaporized and returned to the main or to a gas distribution network at periods of peak demand. By means of the invention, a stream of regenerating gas can be obtained from the purification unit, comprising water vapour adsorber unit and carbon dioxide vapor adsorber unit, which is of a quality suitable for repressurisation and return to the gas main or to the gas distribution network or for subsequent alternative utilization as a valuable process stream.

The invention is now illustrated in more detail with reference to preferred embodiments thereof and with the aid of FIGS. 2 to 6 of the accompanying drawings in which.

Figure 1:
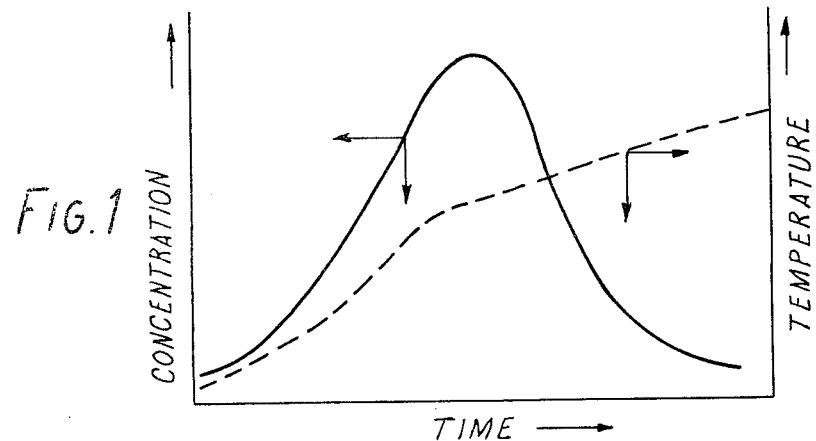
Figure 2:
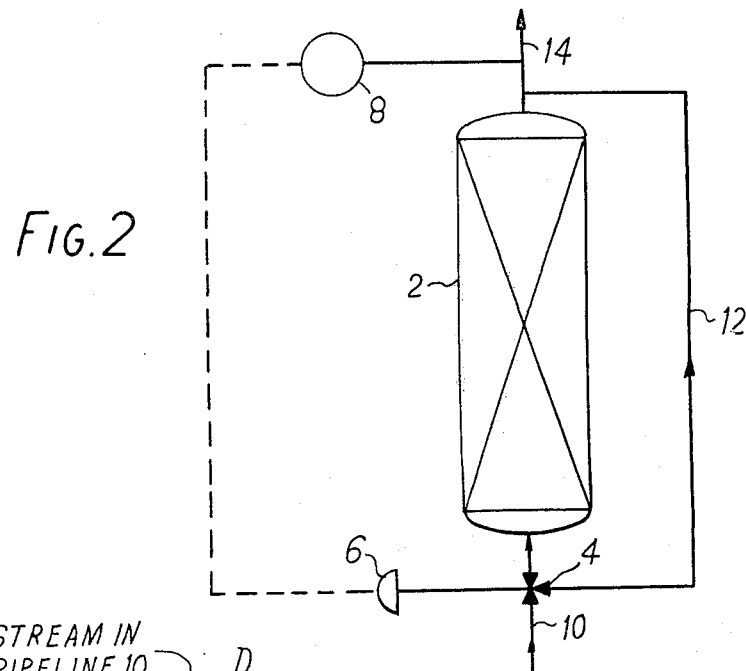
FIG. 2 is a representative flow diagram of one way of using a guard adsorber in accordance with the invention.
Figure 3:
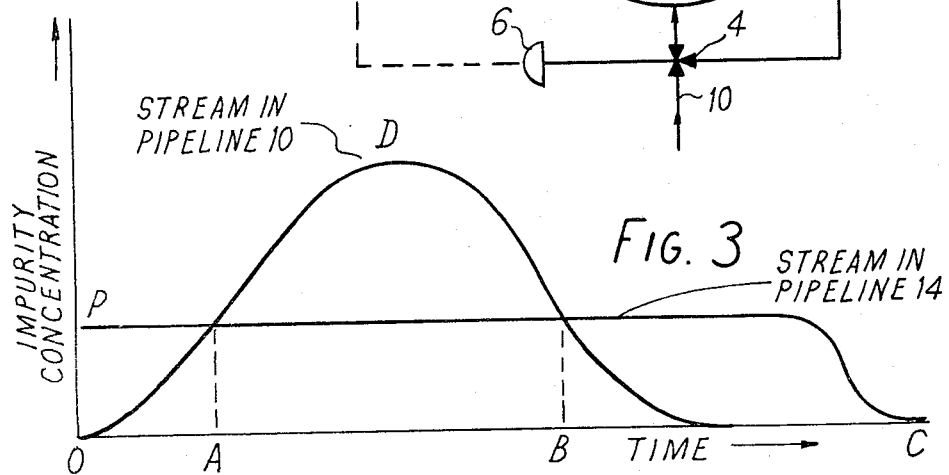
FIG. 3 represents in graphical form the typical variation in concentration of an impurity in a gas stream to be upgraded by the invention and the concentration of the same impurity after passage through the guard adsorber of FIG. 2.

Referring to FIGS. 2 and 3 of the drawings, the gas stream containing fluctuating amounts of impurity enters the unit containing the guard adsorber 2 in pipe 10 and leaves in pipe 14. Between pipes 10 and 14, two flow routes are possible, the first being through vessel 2 which contains adsorbent for the impurity, and the second being through pipeline 12 which by-passes vessel 2. Control of the proportions of the gas stream in pipe 10 which flow through the two routes is provided by three-way valve 4.

While the concentration of the impurity in the gas stream in pipe 14 remains below a predetermined value, for example as indicated by P in FIG. 3, the gas stream flows along pipelines 10, 12, 14 the position of the three-way valve 4 being such that there is substantially no flow through the vessel 2. If the concentration of the impurity reaches P (illustrated at point A on the graph), the position of the three-way valve 4 can then be adjusted so that at least part of the stream is diverted through vessel 2, the adsorbent of which at this time is substantially free of impurity and will therefore adsorb impurity from the gas passing therethrough so that the level of impurity in the gas leaving the vessel will be near zero.

In a typical regenerating stream leaving a bed of adsorbent after regenerating it, the concentration of impurity will continue to increase to a peak value, illustrated at D in FIG. 2, and will then commence to decrease. While the concentration of the impurity in the stream exceeds P, that is between points A and B of FIG. 3, three-way valve 4 is controlled to pass at least a part of the stream through the vessel 2 to adsorb impurity from it whereby to maintain the concentration of impurity in the recombined stream in pipeline 14 below a given value.

When eventually the concentration of impurity in the gas falls below P, as illustrated at point B in FIG. 3, it will contain less impurity than is in equilibrium with the adsorbed phase in the adsorber in vessel 2. The three-way valve 4 is positioned so as to allow at least part of the stream to pass through vessel 2 whereby to strip the adsorbent of desorbed impurity so as to regenerate it ready for use in the next cycle. The gas leaving the vessel during the stripping phase of the cycle will initially maintain an impurity concentration around or possibly somewhat below P, depending upon what proportion of the total capacity of the adsorbent has been used during the adsorption phase of the cycle, but eventually this concentration will also fall off, ultimately reaching a level substantially equal to that of the concentration of the impurity in the stream entering the adsorber, which in FIG. 3 is represented as being near zero. The cycle may then be regarded as complete and the three-way valve 4 can be moved to shut off the inlet to the vessel 2. The cycle may then be repeated when next the impurity level in the stream rises above P, and so on.

During the stripping phase of the cycle, i.e. when the impurity content of the gas passing through the adsorber in the vessel 2 is below P and the gas is stripping adsorbed impurity from the adsorber to prepare it for re-use, it may be desirable to reduce the rate of flow of the stream through the adsorber below the level at which it was flowing during the adsorption period. This is because at least initially the concentration of impurity in the gas stream leaving the adsorber during the stripping period may be relatively high and it is therefore desirable to dilute this gas stream with as large as amount as practicable of gas by-passing the adsorber unit.

It is not essential that the flow control be by means of a three-way valve, as illustrated. For example, the three-way valve 4 may be replaced by two two-way valves, one in pipeline 12 and the other between pipeline 10 and the inlet to the vessel 2, or, more preferably, by a fixed orifice in pipeline 12 and a two-way valve on the inlet side of the vessel 2 downstream of the junction of pipelines 10 and 12.

The valving arrangement may be controlled by a controller 6 which may be made responsive e.g. to a gas analyser 8 adapted to sense the concentration of the impurity in the gas stream in pipeline 14.

Any suitable gas analyser may be used as the analyser 8. For example, one suitable device is a Katharometer which is sensitive to changes in thermal conductivity due to the varying concentrations of the impurity in the gas stream. Where the gas stream contains several impurities, however, an infra-red analyser adjusted to be sensitive only in the region of the, or one or more of the principal, absorption bands of the impurity whose concentration in the gas stream is being measured may be more suitable.

Preferably, the control arrangement is such that during the adsorption phase of the cycle the valve system is adjusted to increase the flow to the vessel 2 in response to a sensed increase in the concentration of impurity in the gas stream but that during the stripping phase of the cycle the arrangement is switched so that the valve system is adjusted to increase the flow to the vessel 2 in response to a sensed decrease in the concentration of impurity in the gas stream.

Where, e.g. as in the case where the gas stream under treatment is a regenerating stream, the fluctuation of the impurity in the stream is substantially regular and predictable, the switching can be effected conveniently by means of a timer arranged to operate at a predetermined time interval after the commencement of the cycle.

At the end of the cycle, the arrangement is switched back, e.g. again by the timer, to its original position wherein increase in sensed impurity concentration increases flow to the vessel 2.

Suitably, the timer may be the timer used to control the switching of the beds of adsorbent in the adsorber unit from which the regenerating stream is recovered for treatment in accordance with the invention.

Alternative methods may be used to control distribution of flow through the pipe 12 and the vessel 2. For example, where the fluctuation of the concentration of the impurity in the gas stream is substantially regular and predictable, the distribution of flow may be controlled entirely by a timer programmed to allow the diversion of gas through the vessel 2 for fixed periods at fixed intervals. Alternatively, the timer may be used in conjunction with a gas analyser which starts the timer each time the concentration of the impurity in the gas stream exceeds a predetermined level. In this latter case, the same timer may be used to reverse the valve control as described above after a predetermined time interval from the commencement of the cycle.

Where the gas stream to be treated by the guard adsorber is a regenerating gas which is at an elevated temperature, it is generally desirable to cool it prior to passage through the adsorbent of the guard adsorber. To this end, it is preferable to include a cooling device which may be in the pipe 10 or between the pipe 10 and the inlet to the vessel 2. In the former location, all the gas stream is cooled whereas in the latter location only that part of the gas stream entering the vessel 2 is cooled. The former location is generally preferred where it is desired that the gas stream leaving pipeline 14 is not at elevated temperature, e.g. where it is to be fed to a gas main or gas supply distribution system.

In the flow stream illustrated in FIG. 2, pipe 12 is indicated as having a length of the order of that of the guard adsorber. It may, however, be preferable to keep the length of this pipe as short as practicable so that any delay between any increase of the concentration of the impurity in the gas stream in pipe 10 above the predetermined level being sensed by the gas analyser 8 located in pipeline 14 is reduced to a minimum.

Figure 4:
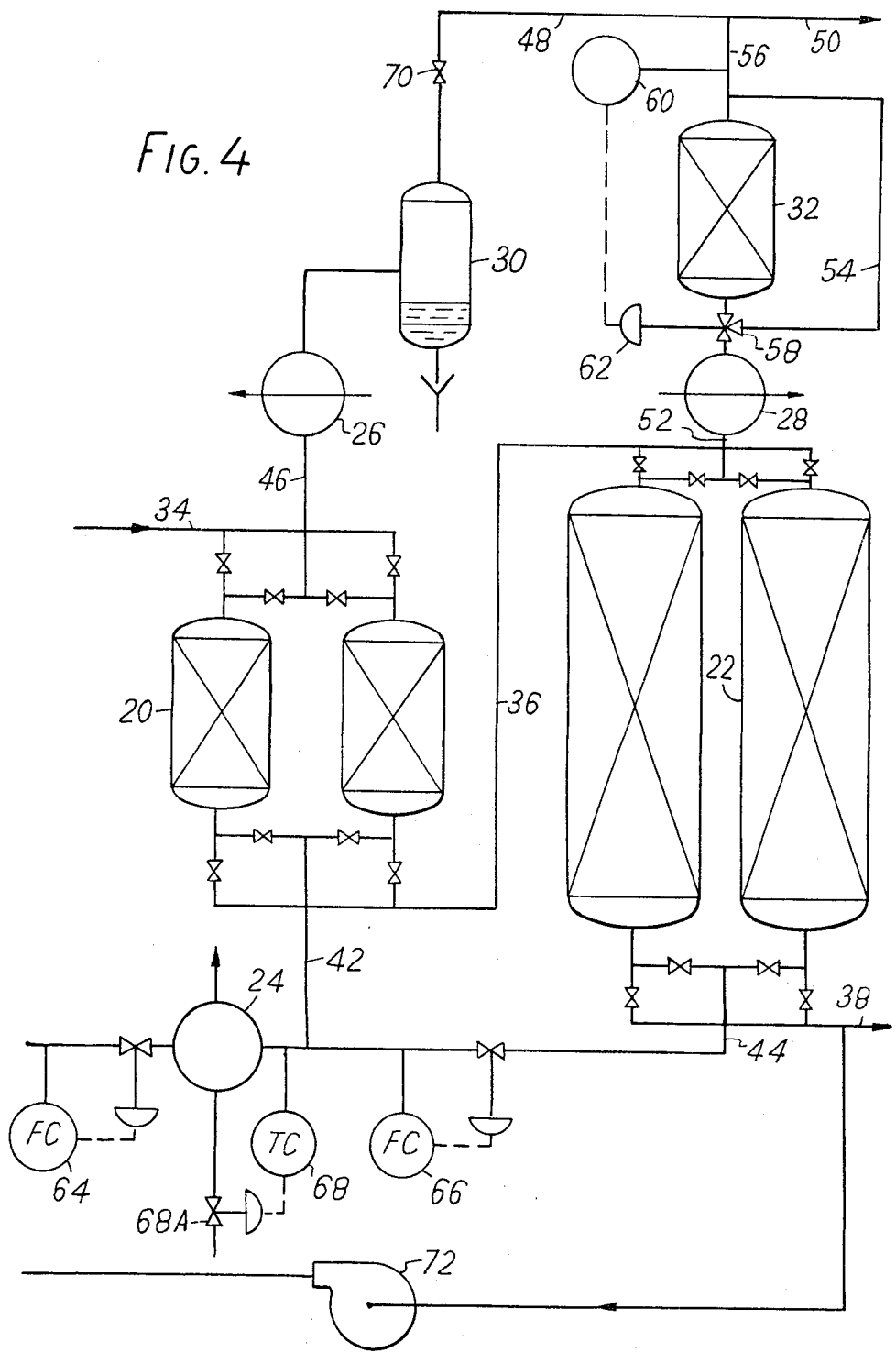
FIG. 4 is a flow diagram illustrating one method of applying the invention in a plant for the purification of natural gas.

FIG. 4 represents one method of applying the invention to upgrading the regenerating gas streams from a plant for purifying for example a hydrocarbon feedstock containing two impurities that require removal one of which is water vapor. By means of the method, both the water dew point and the peak concentration of the other impurity may be reduced in the combined regenerating stream leaving the purification plant.

In the embodiment illustrated, the regenerating streams are derived from the purified hydrocarbon feedstock leaving the plant but they may also be derived from another source, if desired.

The embodiment is described with reference to the purification of a natural gas stream consisting primarily of methane and wherein the impurity other than water vapor is carbon dioxide but it may also be applied to other hydrocarbon streams and to impurities other than carbon dioxide.

Referring to FIG. 4, reference numerals 20 and 22 represent the first and second adsorber units each of which in the embodiment illustrated contains two beds of adsorbent in parallel; 20 is the water vapor adsorber unit and 22 is the carbon dioxide adsorber unit. Reference numeral 24 indicates a heater; reference numerals 26 and 28 indicate coolers; reference numeral 30 indicates a separator; reference numeral 32 indicates the guard adsorber for upgrading the regenerating gas from the carbon dioxide adsorber unit 22; and reference numeral 72 is a compressor which may be, for example, a high speed centrifugal compressor.

Natural gas enters the plant through pipeline 34 and passes through the first adsorber unit 20 which is piped and valved so that one bed is being used while the other is being regenerated. Leaving the first adsorber unit through pipeline 36 it enters the second adsorber unit 22 which is also piped and valved so that one bed is being used while the other is being regenerated, and then leaves the system through pipeline 38.

The first adsorber unit contains an adsorbent which adsorbs water vapor but has little or no tendency to adsorb carbon dioxide while the second contains an adsorbent which adsorbs carbon dioxide. Such adsorbents are well known in the art. The two adsorber units may be in separate housings or may constitute separate portions of an adsorber bed housed in one housing, it being important only to arrange them such that each portion has its own regenerating gas. In general, therefore, it is necessary to make some physical division between the portions.

A regenerating gas stream enters the plant in pipeline 40. Whereas in the embodiment illustrated the regenerating stream is withdrawn from the purified natural gas stream leaving the plant through pipeline 38, it may alternatively be provided from an independent source. Moreover, two separate regenerating streams may be provided if desired, one to each of the adsorber units 20, 22.

In the embodiment illustrated, the regenerating stream withdrawn from the purified natural gas stream is repressurized by compressor 72 to leave the plant in pipeline 50 at substantially the same pressure as the incoming natural gas stream in pipeline 34 so that, for example, it may be returned to the source, e.g. gas main, from which the natural gas is withdrawn for purification. However, in certain circumstances, it is acceptable for the regenerating stream leaving the plant in pipeline 50 to be at a lower pressure, in which case the compressor may be omitted.

From compressor 72, the stream is passed to the heater 24 where it is heated to the desired regeneration temperature which, for the reasons described previously, will be above the temperature of the stream being purified and the stream is then divided into two streams in pipelines 42 and 44 which lead to the adsorber units 20 and 22 respectively. As in general the adsorber for the water vapor (i.e. the first adsorber) will be much smaller than the adsorber for the carbon dioxide (i.e. the second adsorber), the stream in pipeline 42 will be smaller than that in pipeline 44.

The hot regenerating gas stream in pipeline 42 strips the adsorbed water vapor from the bed of adsorbent being regenerated in the first unit and passes through pipeline 46 to cooler 26 where it is cooled by cold water, preferably to room temperature, whereby much of the contained water vapour is condensed out. The condensed water vapor is separated from the gas stream in separator 30 and the resultant stream, which will be at a temperature close to the cooling water temperature and is saturated with water vapor at that temperature, passes through pipeline 48 where it joins the regenerating gas from the second adsorber unit (which is substantially free of water vapor) to form a mixture having a greatly reduced water vapor content and hence lower dew point. This mixture leaves the system through pipeline 50.

The regenerating stream in pipeline 44, which will generally be much larger than that in pipeline 42, strips the adsorbed carbon dioxide from the bed being regenerated in the second adsorber unit 22 and passes via pipeline 52 and cooler 28, where it may be cooled by heat exchange with cold water and is preferably cooled to about room temperature. From cooler 28 it is led to the unit comprising pipelines 54 and 56, three-way valve 58 and guard adsorber 32. The carbon dioxide content of the stream in pipeline 58 is sensed by Katharometer 60 which operates valve controller 62 which controls the position of three-way valve 58. The valve control arrangement is such that while the carbon dioxide level in the stream in pipeline 56 is below a predetermined level, the inlet to the adsorber zone 32 is closed and all the gas passes through pipelines 54 and 56 to mix with the regenerating gas in pipeline 48 from the first adsorber unit 20 and leave the system through pipeline 50. When the carbon dioxide level exceeds said predetermined level, the Katharometer 60 activates controller 62 to adjust valve 58 to allow gas to pass into adsorber zone 32. Initially, the arrangement is such that any increase in impurity concentration sensed by Katharometer 60 acts to increase the flow through adsorber zone 32. After a time interval which corresponds to the end of the adsorption phase and can conveniently be determined from the observed or calculated distribution of the impurity concentration in the stream leaving adsorber unit 22, the arrangement is reversed so that any increase in impurity concentration sensed by Katharometer 60 acts to reduce the flow through adsorber 32. After a further time interval, which corresponds to the end of the stripping phase, the arrangement is switched back again ready for the next cycle. The switching can conveniently be effected by the timer used to switch the regenerating stream between the two beds of adsorbent in adsorber unit 22.

The flows to the two adsorber units 20 and 22 can be controlled by flow controllers 64 and 66 and the heater 24 for raising the temperature of the regenerating gas streams to the required level may be controlled by temperature controller 68 which may be arranged to control valve 68A which in turn may control the flow of heating medium to heater 24. If the pressure drop through water vapor adsorber unit 20 is much lower than that through the carbon dioxide adsorber unit 22, the flow through the latter may not be adequate even with flow control valve 66 fully open. It may therefore be desirable to include a valve or fixed orifice 70 downstream of the separator 30 in the pipeline carrying the regenerating gas stream from the water vapor adsorber unit so as to ensure an adequate pressure drop through the water adsorber system for satisfactory operation of flow controller 66.

The stream leaving the plant in pipeline 50 and obtained by combining the regenerating gas streams from the two adsorber units will have both a low dew point and a smoothed carbon dioxide concentration, thus making it suitable for further use, e.g. as a process stream or as part of a domestic gas supply.

The arrangement shown in FIG. 4 presupposes that the regenerating streams to the two adsorber units 20 and 22 are to be heated to the same temperature. However, this need not be the case. For example, if the water vapor adsorber unit 20 contains silica gel as the adsorbent, it is possible to regenerate it satisfactorily at a temperature of e.g. about 200°C which is below the temperature of e.g. about 300°C preferred for regenerating the commonly used carbon dioxide adsorbents. In such a case, it may be preferred to use two heaters, one in pipeline 42 and one in pipeline 44, in place of heater 24. Each heater may have its own associated temperature controller.

Figure 5:
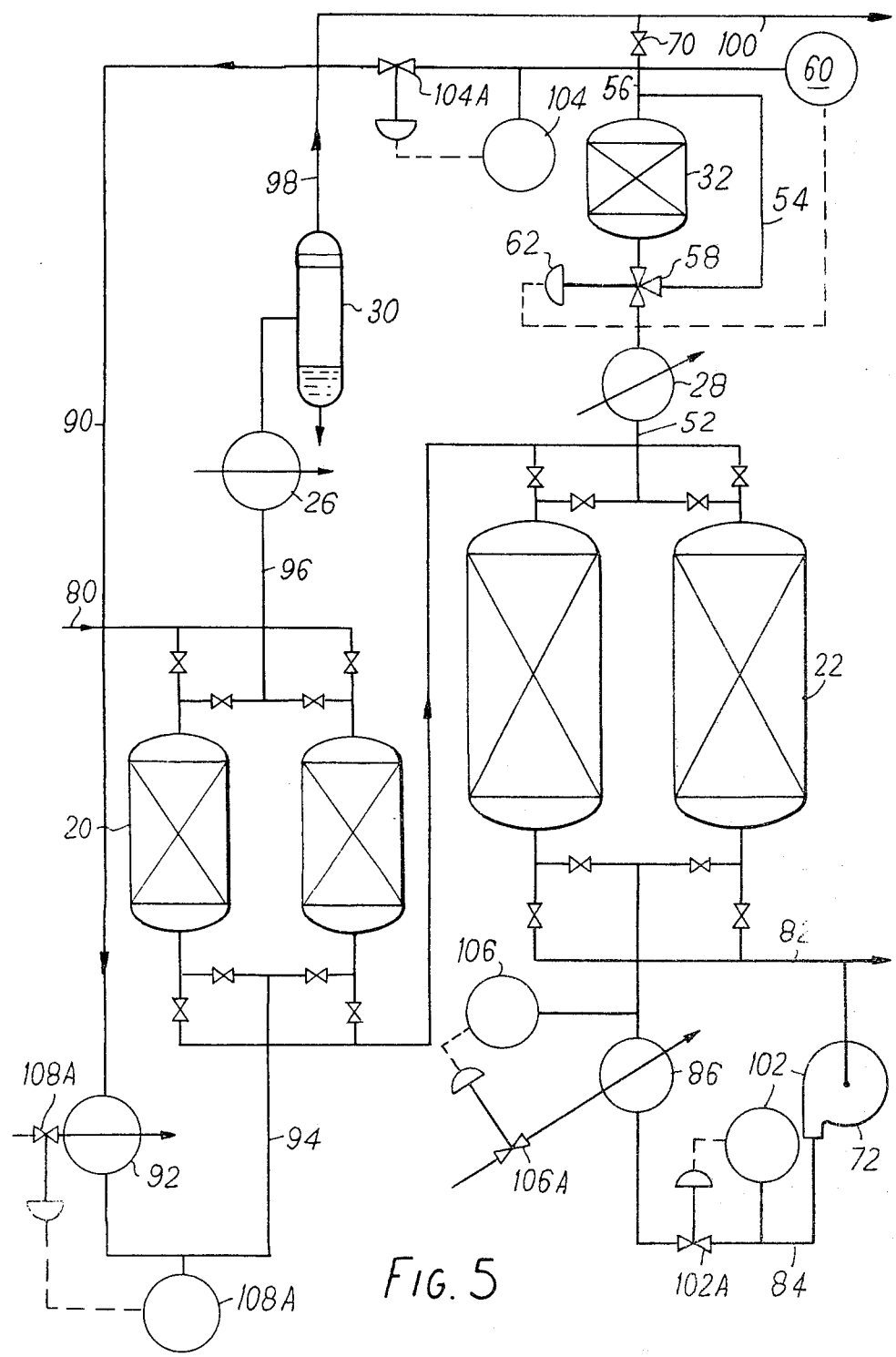
FIG. 5 is a flow diagram illustrating an alternative method of applying the invention in a plant for the purification of natural gas.

FIG. 5 illustrates an alternative arrangement to that shown in FIG. 4, and the same reference numerals are used for the items of equipment that are the same as those in FIG. 4.

In the plant represented in FIG. 5, the natural gas feedstock to be purified enters the plant through pipeline 80 and passes through the first and second adsorber units 20, 22 as described in FIG. 4 and leaves the plant in pipeline 82.

The regenerating gas stream enters through pipeline 84. In the embodiment illustrated, it is provided by removing a portion of the purified natural gas stream from pipeline 82 but it may also be provided from an independent source.

The whole of this stream is heated in heater 86 to the required temperature (e.g. 300°C) for regenerating the second, or carbon dioxide, adsorber unit 22 and then directed through this unit to regenerate one of the beds while the other is being used to purify the natural gas stream. The hot regenerating gas leaves this adsorber unit through pipeline 52 by which it is fed to cooler 28, where it is cooled e.g. by heat exchange with cold water and preferably to room temperature, and thence to the guard adsorber unit which consists of the same arrangement of units and operates in the same way as described above with reference to FIG. 4.

Part of the stream having the smoothed carbon dioxide content leaving the guard adsorber is removed through pipeline 90 and fed to heater 92 where it is reheated to the temperature required for regenerating the first, or water vapor, adsorber unit 20. For instance, where the adsorbent is silica gel, a suitable temperature is about 200°C. From heater 92, the stream is passed to the water vapor adsorber unit by pipeline 94 and after passage through the unit is passed via pipeline 96 to cooler 26, where it is cooled e.g. by heat exchange with cold water and preferably to room temperature, and thence to separator 30, where the water condensed by cooling is separated from the gas. The gas from the separator is then passed through pipeline 98 to be combined with the remainder of the stream leaving the guard adsorber unit and leaves the plant in pipeline 100.

In this arrangement, the flow of the regenerating gas to the carbon dioxide adsorber unit 22 may be regulated by flow controller 102 operating valve 102A and the flow of the portion of the gas stream withdrawn through pipeline 90 from the stream leaving the guard adsorber for the purpose of regenerating the water vapor adsorber unit 20 may be regulated by flow controller 104 operating valve 104A. The temperature of the regenerating stream in pipeline 84 for the carbon dioxide adsorber unit 22 may be controlled by means of temperature controller 106 operating valve 106A arranged to control the flow of heating medium to heater 86, and the temperature of the regenerating stream in pipeline 90 for the water vapor adsorber unit 20 may be controlled by temperature controller 108 operating valve 108A arranged to control the flow of heating medium through heater 92. The two heaters may conveniently be indirect counter-current heat exchangers.

It will be noted that in this system the valve or fixed orifice 70 provided to ensure an adequate pressure drop through the system for satisfactory operation of the flow controllers is located in pipeline 56 downstream of the junction with pipeline 90.

As in the plant described with reference to FIG. 4, the regenerating stream leaving the plant will have both a low dew point and a smoothed carbon dioxide concentration, thus making it suitable for further use e.g. as a process stream or as, or as part of, a domestic gas supply. The arrangement illustrated in FIG. 5, however, requires less of the purified gas stream for regeneration purposes since the regenerating stream for the water vapor adsorber unit is derived from, rather than additional to, the regenerating stream for the carbon dioxide adsorber unit and therefore allows a greater net production of purified natural gas. On the other hand, since the total flow of regenerating gas is less than that in the arrangement of FIG. 4, the dew point of the stream leaving the system in pipeline 100 will not be as low as that in pipeline 50.

It will be understood that the arrangements illustrated in FIGS. 4 and 5 are capable of modification. Thus, for example, the cooler 28 may be sited downstream of the three-way valve 58, if desired, whereby it is only required to cool that part of the regenerating gas stream from the carbon dioxide adsorber unit 22 which is fed to the adsorbent zone of the guard adsorber. This will reduce the demand of cooling liquid and, in the plant illustrated in FIG. 5, will also lead to a reduction in the heat output of heater 92 since the stream in pipeline 90 will be less cold. However, this arrangement is not desirable where the regenerating gas stream leaving the plant is required to be cold.

Figure 6:
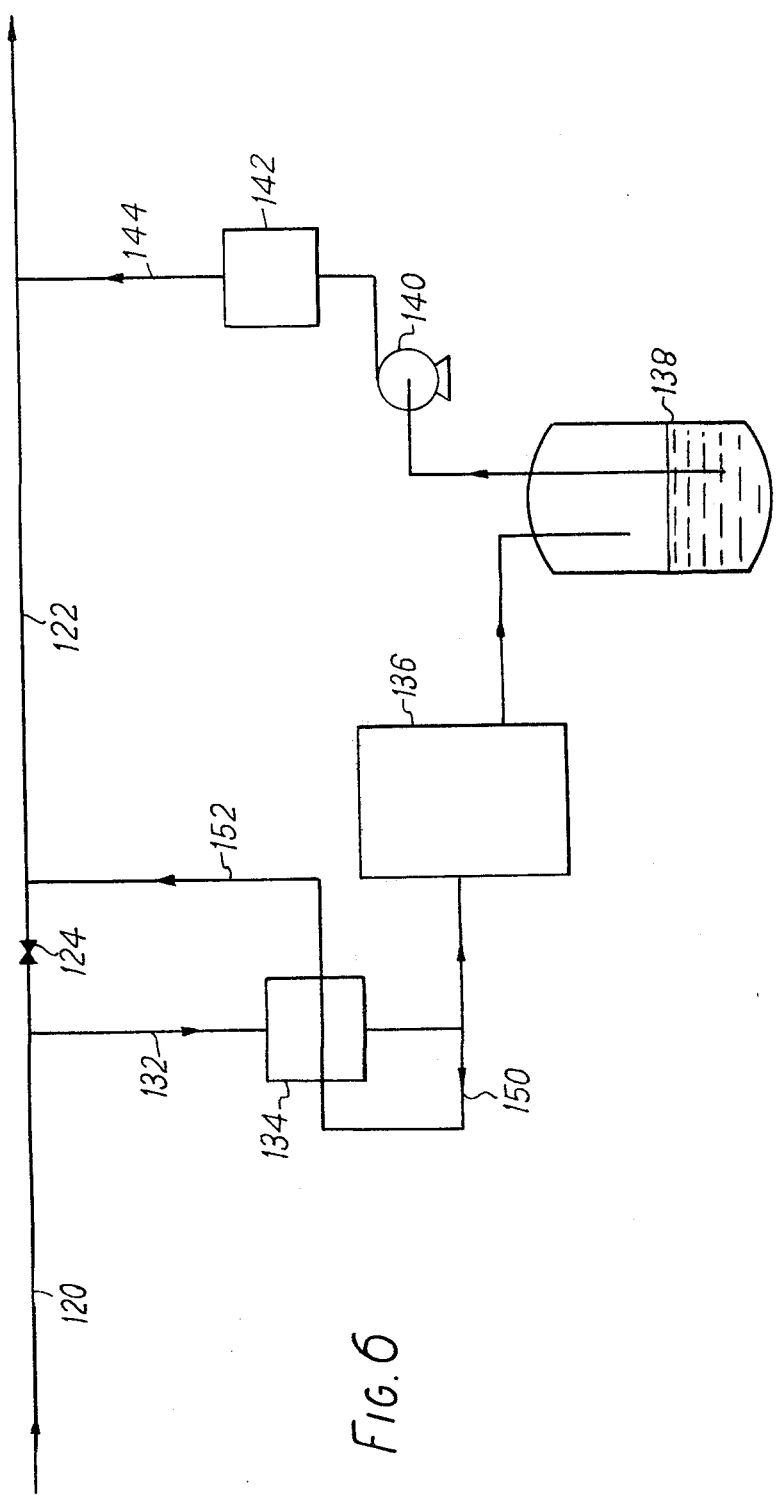
FIG. 6 is a simplified flow diagram illustrating the application of the invention to a natural gas peak shaving plant.

FIG. 6 represents the use of the arrangement shown in FIG. 4 or FIG. 5 in a peak-shaving plant for natural gas. In such a plant, natural gas is removed from a gas main, liquefied and stored and the stored liquefied gas is then released to supplement the supply during periods of peak demand. Referring to FIG. 6, gas main 120 supplies a distribution network represented by reference numeral 122 which is at a lower pressure than the gas main pressure, the pressure drop being represented by letdown valve 124. Natural gas is withdrawn from the gas main 120 through pipeline 132, purified in purifier 134, liquefied in refrigeration unit 136 and stored in storage tank 138. In periods of peak demand, it is pumped from the storage tank 138 by pump 140, revaporized vaporizer 142 and supplied to the gas distribution network represented by reference numeral 122 through pipeline 144.

In accordance with the invention the apparatus described with reference to FIG. 4 or FIG. 5 may be used to purify the gas stream in purifier 134 prior to liquefaction in refrigeration unit 136. The regenerating gas for the adsorber units of the purifier 134 may be withdrawn in pipeline 150 from the purified natural gas stream leaving the purifier 134 and after regenerating the beds of the two adsorber units and subsequent treatment to smooth the carbon dioxide concentration and lower the dew point, as described above, may be led through pipeline 152 to supplement the gas supply in the distribution network 122. As this distribution network is at a lower pressure than gas main 120, there may be no need to repressurise the regenerating stream in pipeline 150 and thus compressor 72 in FIGS. 4 and 5 may be omitted.

It will be appreciated that if the guard adsorber unit is omitted from the arrangements illustrated in FIGS. 4 and 5, the apparatus illustrated will still provide a regenerating stream of reduced dew point in a very simple manner and that such a stream may also be suitable for use as a process stream for certain applications even though it may contain fluctuating amounts of the other impurity.

The invention is now further illustrated with reference to the following Example which utilizes the arrangement illustrated in FIG. 4. The water vapor adsorber unit comprises two beds each 1 ft in diameter and with a packed length of 3 ft utilising a synthetic zeolite molecular sieve of the type known as 3A. The beds are arranged in known manner so that while one is being used to purify a gas stream, the other is being regenerated. In similar fashion, the carbon dioxide adsorber unit comprises two beds each 2.5 ft in diameter and with a packed length of 13 ft utilizing a synthetic zeolite molecular sieve of the type known as 4A. The adsorber bed of the guard adsorber also utilizes a synthetic zeolite molecular sieve of the type known as 4A and has a diameter of 2.5 ft and a packed length of 6 ft.

Methane containing water vapor and carbon dioxide as impurities enters the system through pipeline 34 at a flow rate of 50,000 NCFH (normal cubic feet per hour) at ambient temperature and at a pressure of 700 lbs/sq inch gauge. The gas is saturated with water vapor at 25°C and contains 0.5% carbon dioxide by volume.

The regenerating stream for the two adsorber units is withdrawn from the purified methane stream leaving the system in pipeline 38 and repressurized so as to leave the system in pipeline 50 at the same pressure as the incoming gas, i.e. 700 lbs/sq. in. The regenerating stream is heated to 300°C by heater 24 and then divided into two streams. The rates of flow of these streams are 3000 NCFH through the water vapor adsorber unit and 12,000 NCFH through the carbon dioxide adsorber unit.

The coolers 26 and 28 are arranged to cool the regenerating streams to substantially ambient temperature. The change-over period of the adsorber beds in each adsorber unit is about 8 hours.

With the guard adsorber 32 being in use for about 6 hours in each period, the carbon dioxide content of the stream in pipeline 50 is found to be about 1.7%. The water dew point of the same stream is about 0.5°C. If the guard adsorber is omitted, the carbon dioxide content in pipeline 56 fluctuates to levels as high as about 8% be volume.

Whereas the invention has been illustrated with particular reference to the treatment of a natural gas stream containing carbon dioxide impurity, it is to be understood that it can also be applied to other impurities and to other gas streams. For example, it may also be applied to the treatment of regenerating streams containing sulphur dioxide or hydrogen sulphide as impurities recovered from adsorber units used to remove them from sour gas streams. It may also be applied to the treatment of regenerating streams containing benzene as an impurity recovered from an adsorber unit used to remove it from a light hydrocarbon stream such as a natural gas stream.

I claim:

1. A method of upgrading an impurity-containing gas stream in which the concentration of the impurity varies with time, to provide a product stream in which the concentration of impurity substantially does not exceed a predetermined value which is between the maximum and minimum levels of concentration of impurity found in the gas stream said method comprising:
   i. sensing the level of concentration of impurity in the gas stream;
   ii. when the sensed level of concentration of impurity in the gas stream rises to said predetermined value, withdrawing at least a part of said gas stream, purifying said withdrawn part by passing said part through an adsorption zone containing adsorbent for said impurity whereby to adsorb said impurity from said withdrawn part, and thereafter recombining the purified part with any remainder of said gas stream to form said product stream;
   iii. continuing step (ii) while the concentration of impurity in the gas stream exceeds said predetermined value;
   iv. controlling the proportion of gas stream that is withdrawn and purified in accordance with steps (ii) and (iii) so as to maintain the overall concentration of impurity in said product stream substantially at or below said predetermined value;
   v. after the concentration of the impurity in said gas stream has returned below said predetermined value, regenerating said adsorbent for subsequent re-use by withdrawing at least a part of said gas stream and passing said part through said adsorption zone whereby to desorb from said adsorbent impurity adsorbed thereby during steps (ii) and (iii);
   vi. terminating step (v) after the impurity adsorbed by said adsorbent during steps (ii) and (iii) has been substantially removed; and
   vii. repeating steps (ii) through (vi) each time the sensed concentration of impurity in the gas stream rises to said predetermined level.

2. A method as claimed in claim 1 in which the gas stream to be upgraded is a regenerating stream containing fluctuating amounts of an impurity desorbed from an adsorber unit used to purify a gaseous process stream by removal of said impurity from it.

3. A method as claimed in claim 2 in which the regenerating stream is a hot regenerating stream and the proportion which is diverted through the adsorption zone is cooled prior to passage through said zone.

4. A method as claimed in claim 2 in which the gaseous process stream contains a second impurity which is removed therefrom by passing said process stream through a second adsorber unit, the two adsorber units being arranged in series with respect to the flow of the process stream therethrough with each adsorber being supplied with a separate regenerating stream and wherein the upgraded regenerating stream is combined with the regenerating stream from said second adsorber for subsequent utilization.

5. A method as claimed in claim 4 in which the gaseous process stream is a hydrocarbon feedstock containing water vapor as said second impurity and the regenerating stream supplied to the second adsorber unit is passed through said unit at elevated temperature to desorb water vapor from said second adsorber unit, and thereafter cooled to condense water from the stream prior to combination with said upgraded regenerating stream for subsequent utilization.

6. A method as claimed in claim 4 in which each regenerating stream is derived from the gaseous process stream which has been purified by passage through the two adsorber units.

7. A method as claimed in claim 2 in which the gaseous process stream contains water vapor as a second impurity which is removed from the stream by passing the stream through a second adsorber unit, the two adsorber units being arranged in series with respect to the flow of the stream therethrough, and in which at least a portion of the upgraded regenerating stream is passed through said second adsorber unit at elevated temperature as a regenerating stream therefor to desorb water vapor therefrom, subsequently cooled to condense out water and recombined with the remainder, if any, of said upgraded regenerating stream for subsequent utilization.

8. A method as claimed in claim 7 in which the regenerating stream which is upgraded is derived from the gaseous process stream which has been purified by passage through the two adsorbers.

9. A method as claimed in claim 1 in which the impurity present in fluctuating amounts is carbon dioxide.

10. A method as claimed in claim 2 in which the gaseous process stream is natural gas.

11. A method as claimed in claim 6 in which the gaseous process stream is derived from a stream of natural gas and is liquefied for storage after purification by passage through the two adsorbers and in which the product through combining the regenerating streams is returned to the stream of natural gas downstream from the point of derivation.

12. A method as claimed in claim 8 in which the gaseous process stream is derived from a stream of natural gas and is liquefied for storage after purification by passage through the two adsorbers and in which the product of combining the regenerating stream from the second adsorber with the remainder if any of the upgraded regenerating stream is returned to the stream of natural gas downstream from the point of derivation.

13. A method of obtaining a regenerating stream having a low water dew point from adsorber units used in the purification of a gas stream containing water vapor and at least one other impurity which method comprises passing said gas stream in series through at least two adsorber units one of which adsorbs the water vapor and the other of which adsorbs said other impurity, passing a first regenerating stream at elevated temperature through the water vapor adsorber unit to desorb the water vapor therefrom, passing another regenerating stream through said other adsorber unit to desorb said other impurity therefrom, cooling the regenerating stream leaving the water vapor adsorber unit to condense water therefrom, separating out the condensed water and combining the residual gas stream with the regenerating stream from said other adsorber unit.

14. A method as claimed in claim 1 in which during steps (ii) and (iii) the proportion of said gas stream that is withdrawn is increased with increase in the level of concentration of impurity in the gas stream and decreased with decrease in said level, and during step (v) the proportion of said gas stream that is withdrawn is increased with decrease in the level of concentration of impurity in the gas stream.

15. Apparatus for upgrading an impurity-containing gas stream in which the concentration of the impurity varies with time, to provide a product stream in which the concentration of the impurity substantially does not exceed a predetermined value which is between the maximum and minimum levels of concentration of impurity found in the gas stream, said apparatus comprising:
   a. pipeline means for conveying said gas stream from an inlet to an outlet of the apparatus;
   b. vessel means for containing an adsorbent for said impurity, said vessel means having a gas inlet and a gas outlet;
   c. conduit means for diverting at least a portion of the gas stream from said pipeline means through said vessel means and thereafter returning it to the pipeline means downstream of the point from which it was diverted;
   d. valve means for controlling the proportion of the gas stream that is diverted from said pipeline means through said vessel means;
   e. measuring means for continuously measuring the level of the concentration of the impurity in the product stream at a point downstream of where that portion of the gas stream which is diverted through said vessel means is returned into said pipeline means, said measuring means being adapted to provide a signal corresponding to the measured level of impurity concentration;
   f. first automatic valve control means for opening said valve means in response to said signal when the measured level of concentration of the impurity in said gas stream rises above a predetermined level and for controlling the degree of opening of said valve means while said concentration exceeds said predetermined level to prevent the measured level of concentration of impurity in said product stream from rising substantially above said predetermined level; and
   g. second automatic valve control means for controlling the valve means to allow the diversion of at least a portion of the gas stream through said vessel means after the level of impurity in said gas stream has fallen below said predetermined level, and to close the valve means after the adsorbent in said vessel means has substantially been regenerated.

16. Apparatus as claimed in claim 15 further including two adsorber units arranged upstream of and connected to said pipeline means for passage therethrough in series of a gaseous process stream to be purified, each adsorber unit being piped and valved to permit regeneration of the adsorbent by passage therethrough of a separate regenerating gas stream, and wherein the outlet for the regenerating gas leaving one of said adsorber units is connected to the inlet to said pipeline means and the other of said adsorber units is a water vapor adsorber unit, said apparatus also including means for heating the regenerating gas stream to be fed to each adsorber unit, means for cooling, the regenerating gas stream from said water vapor adsorber unit to condense the water vapor in it, separator means for separating the condensed water from the cooled regenerating gas stream and means for combining the gas stream from said separator means with the gas leaving said pipeline means.

17. Apparatus as claimed in claim 15 further including two adsorber units arranged upstream of and connected to said pipeline means for passage therethrough in series of a gaseous process stream to be purified, each adsorber unit being piped and valved to permit regeneration of the adsorbent by passage therethrough of a regenerating gas stream and wherein the outlet for the regenerating gas leaving one of said adsorber units is connected to the inlet of said pipeline means and the other adsorber unit is a water vapor adsorber unit, said apparatus also including means for heating the regenerating stream to be fed to said one adsorber unit, means for withdrawing at least part of the gas stream recovered from the outlet of said pipeline means, and feeding it as a regenerating means for cooling the regenerating stream recovered from said water vapor adsorber unit, separator means for separating condensate from the cooled regenerating stream and means for recombining the gas stream recovered from the separator with the remainder if any of the regenerating stream leaving said pipeline means.

18. Apparatus as claimed in claim 15 in which said first automatic valve control means is adapted in an initial mode of operation to control the valve means in the sense of increasing the degree of valve opening with increase in the level of concentration of impurity in the gas stream and reducing the degree of valve opening with decrease in said level, and said second automatic valve control means comprises timing means and reversing means responsive to said timing means for reversing the mode of operation of said first valve control means, said timing means being adapted to activate said reversing means after a first time interval to reverse the mode of operation of said first valve control means, whereby decrease in the level of impurity in the gas stream increases the degree of valve opening, and to activate said reversing means again after a second time interval to restore said first automatic valve control means to said initial mode of operation.

19. Apparatus as claimed in claim 18 further including principal adsorber means of the kind including at least two adsorption zones, an inlet and outlet for gas to be treated in the principal adsorber means, an inlet and outlet for regenerating gas, means connecting at least one of the adsorption zones, between said inlet and outlet for the gas to be treated, for passage of said gas through said zone for adsorption of adsorbable impurity from said gas, means connecting at least another of said adsorption zones between said inlet and outlet for regeneration gas for passage of said gas through said other zone for regeneration of the adsorber in said zone, and automatic means for periodically disconnecting said one zone from between first mentioned inlet and outlet and subsequently connecting it between said second mentioned inlet and outlet and for periodically disconnecting said other zone from between said second mentioned inlet and outlet and subsequently connecting it between said first mentioned inlet and outlet; the regeneration gas outlet of said principal adsorber means communicating with said pipeline means upstream of said conduit means; and wherein said automatic means comprises a timing means which also provides the timing means of said second automatic valve control means.

* * * * *